United States Patent
Gan et al.

(10) Patent No.: US 10,403,313 B1
(45) Date of Patent: Sep. 3, 2019

(54) HEAT-ASSISTED MAGNETIC RECORDING HEAD HAVING A TRENCH ON APERTURE WAVEGUIDE OUTPUT END

(71) Applicant: Seagate Technology LLC, Cupertino, CA (US)

(72) Inventors: Choon How Gan, Derry (GB); Mark Anthony Gubbins, Donegal (IE); Roberto Fernandez Garcia, Derry (GB); Michael James Hardy, Londonderry (GB); Andres David Barbosa Neira, Derry (GB); Yuhang Cheng, Edina, MN (US); Weibin Chen, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/991,010

(22) Filed: May 29, 2018

Related U.S. Application Data

(60) Provisional application No. 62/517,432, filed on Jun. 9, 2017.

(51) Int. Cl.

| | |
|---|---|
| *G11B 11/105* | (2006.01) |
| *G11B 5/48* | (2006.01) |
| *G11B 13/08* | (2006.01) |
| *G02B 6/122* | (2006.01) |
| *G11B 5/31* | (2006.01) |
| *G11B 5/00* | (2006.01) |

(52) U.S. Cl.
CPC .......... *G11B 5/4866* (2013.01); *G02B 6/1226* (2013.01); *G02B 6/1228* (2013.01); *G11B 5/3133* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,440,660 B1* | 10/2008 | Jin | ........................ | B82Y 10/00 |
| | | | | 369/112.27 |
| 7,706,654 B2* | 4/2010 | Peng | ..................... | G11B 5/314 |
| | | | | 369/112.27 |
| 8,451,705 B2 | 5/2013 | Peng et al. | | |
| 8,605,556 B1* | 12/2013 | Peng | ..................... | G11B 5/314 |
| | | | | 369/13.13 |
| 8,630,152 B2* | 1/2014 | Jin | ...................... | G11B 5/1278 |
| | | | | 369/13.01 |

(Continued)

*Primary Examiner* — Tan X Dinh
(74) *Attorney, Agent, or Firm* — Hollingsworth Davis, LLC

(57) ABSTRACT

An apparatus includes a slider configured for heat-assisted magnetic recording. The slider comprises an input coupler configured to receive light excited by a light source and a waveguide. The waveguide comprises a waveguide core tapering along a light propagation direction from a first cross-sectional width to a second cross-sectional width. The second cross sectional width is smaller than the first cross sectional width. The waveguide core comprises a trench at an output end. The waveguide comprises at least one cladding layer surrounding the waveguide core. The waveguide is configured to provide a surface plasmon-enhanced near-field radiation pattern proximate the output end in response to the received light.

20 Claims, 8 Drawing Sheets

(56) References Cited

U.S. PATENT DOCUMENTS

| | | | |
|---|---|---|---|
| 8,958,668 B2 * | 2/2015 | Peng | G11B 5/6088 |
| | | | 216/24 |
| 9,099,130 B2 | 8/2015 | Gubbins et al. | |
| 9,201,178 B2 | 12/2015 | Peng et al. | |
| 9,230,582 B2 | 1/2016 | Itagi et al. | |
| 9,484,051 B1 * | 11/2016 | Krichevsky | G11B 5/3133 |
| 9,558,770 B2 | 1/2017 | Yang et al. | |
| 9,960,570 B1 * | 5/2018 | Goggin | H01S 5/14 |
| 10,036,851 B1 | 7/2018 | Peng et al. | |
| 10,062,400 B1 | 8/2018 | Harvey et al. | |
| 10,127,935 B2 * | 11/2018 | Fernandez Garcia | |
| | | | G02B 6/1226 |
| 2013/0064051 A1 * | 3/2013 | Peng | G11B 5/3133 |
| | | | 369/13.33 |
| 2013/0064502 A1 * | 3/2013 | Peng | G11B 5/6088 |
| | | | 385/31 |
| 2013/0071062 A1 * | 3/2013 | Peng | G11B 5/314 |
| | | | 385/31 |
| 2013/0223196 A1 | 8/2013 | Gao et al. | |
| 2013/0279035 A1 | 10/2013 | Peng et al. | |
| 2015/0003218 A1 * | 1/2015 | Peng | G11B 5/4866 |
| | | | 369/13.17 |
| 2016/0293189 A1 * | 10/2016 | Yang | G02B 6/126 |
| 2018/0108373 A1 | 4/2018 | Fernandez Garcia et al. | |

* cited by examiner

HEAT-ASSISTED MAGNETIC RECORDING HEAD HAVING A TRENCH ON APERTURE WAVEGUIDE OUTPUT END

RELATED APPLICATIONS

This application claims the benefit of Provisional Patent Application Ser. No. 62/517,432 filed on Jun. 9, 2017, which is hereby incorporated herein by reference in its entirety.

SUMMARY

Embodiments described herein are directed to an apparatus comprising a slider configured for heat-assisted magnetic recording. The slider comprises an input coupler configured to receive light excited by a light source and a waveguide. The waveguide comprises a waveguide core tapering along a light propagation direction from a first cross-sectional width to a second cross-sectional width. The second cross sectional width is smaller than the first cross sectional width. The waveguide core comprises a trench at an output end. The waveguide comprises at least one cladding layer surrounding the waveguide core. The waveguide is configured to provide a surface plasmon-enhanced near-field radiation pattern proximate the output end in response to the received light.

Embodiments are directed to an apparatus comprising a slider configured for heat-assisted magnetic recording. The slider comprises an input coupler configured to receive light excited by a light source and a waveguide. The waveguide comprises a waveguide core tapering along a light propagation direction from a first cross-sectional width to a second cross-sectional width. The second cross sectional width is smaller than the first cross sectional width. The waveguide core comprises a trench extending along at least a portion of the waveguide core. The waveguide comprises at least one cladding layer surrounding the waveguide core. The waveguide is configured to provide a surface plasmon-enhanced near-field radiation pattern proximate the output end in response to the received light.

A method comprises providing a surface plasmon-enhanced near-field radiation pattern to an output end of a waveguide in response to receiving light output by a light source. The waveguide comprises a waveguide core tapering along a light propagation direction from a first cross-sectional width to a second cross-sectional width. The second cross sectional width is smaller than the first cross sectional width. The waveguide core comprises a trench at the output end. The waveguide comprises at least one cladding layer surrounding the waveguide core.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm (e.g., ~50 nm).

Figure 1:
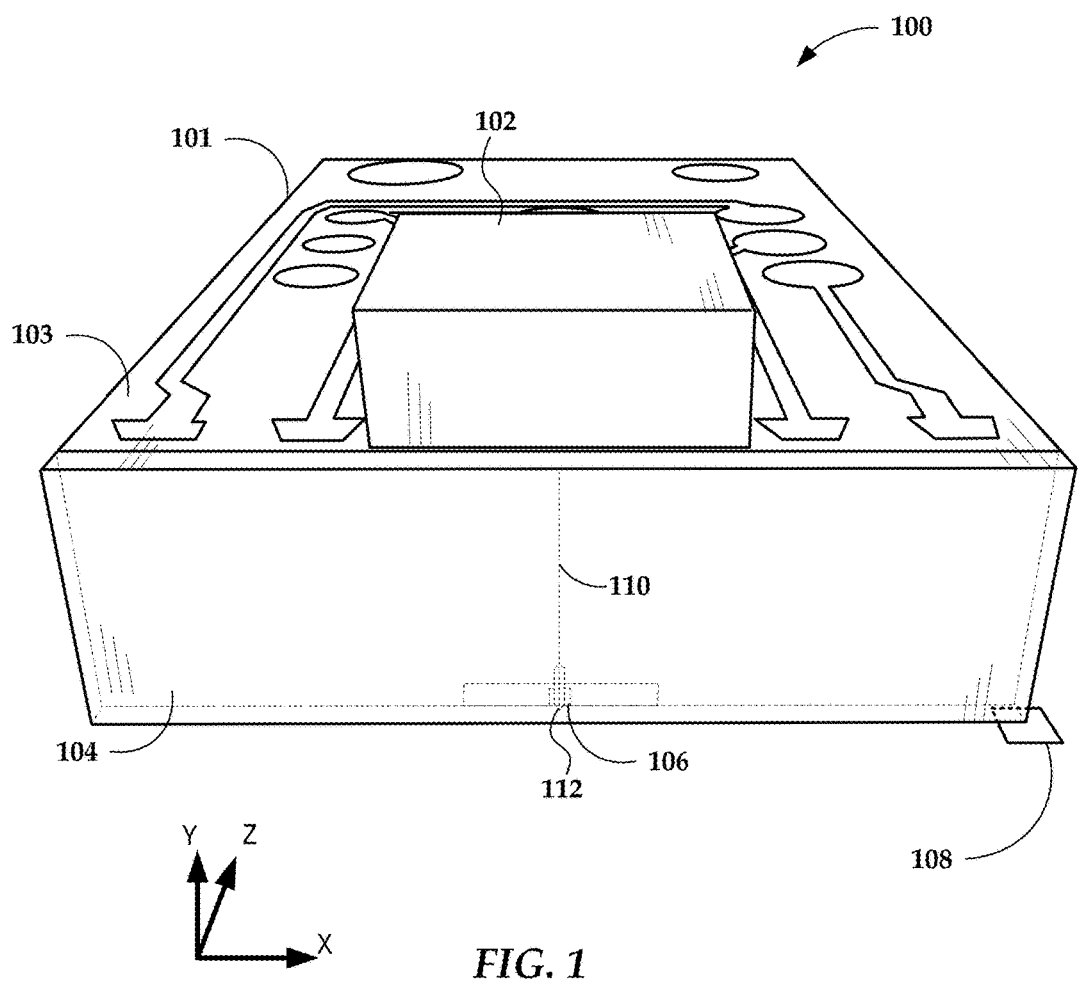
FIG. 1 is a perspective view of a hard drive slider that includes a waveguide in accordance with embodiments described herein.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a mode converting waveguide system 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled via an input coupler or a spot size converter to the slider by way of optic fiber and/or waveguide. An input surface of the slider body 101 may include a grating or other coupling feature to receive light from the laser via the optic fiber and/or waveguide.

Figure 2A:
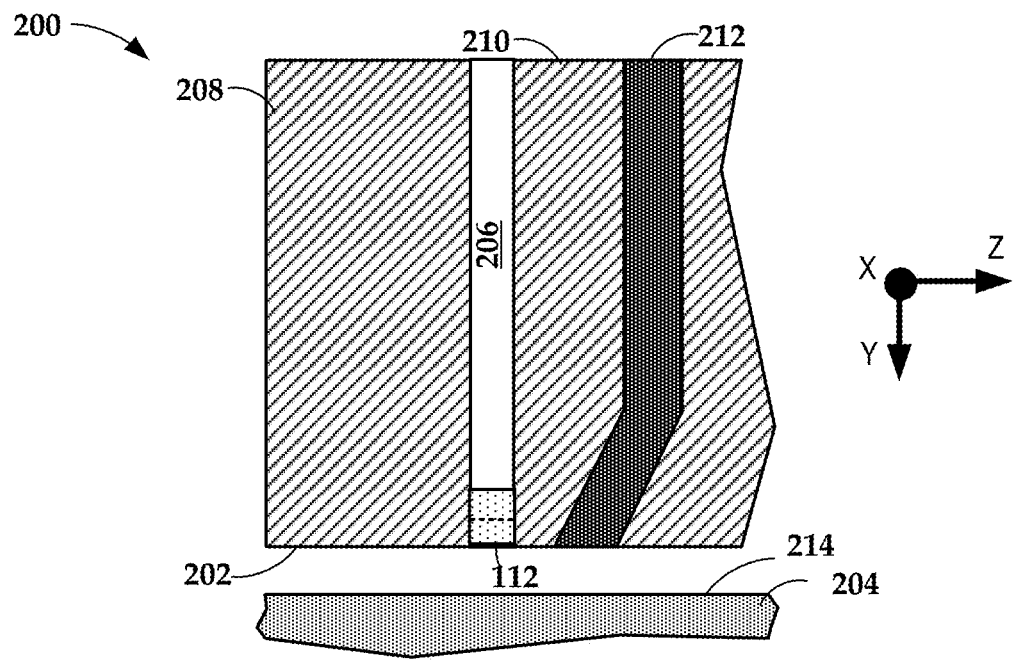
FIG. 2A is a cross-sectional view shows details of a HAMR apparatus in accordance with embodiments described herein.

In reference now to FIG. 2A, a cross-sectional view shows details of a HAMR apparatus 200 according to an example embodiment. NFT 112 is located proximate a media-facing surface 202 (e.g., ABS), which is held near a magnetic recording media 204 during device operation. In the orientation of FIG. 2A, the media-facing surface 202 is arranged parallel to the x-z plane. A waveguide core 206 may be disposed proximate the NFT 112, which is located at or near the media writing surface 214.

An NFT is any known plasmonic material (e.g., Au, Ag, Cu) and may be positioned at or near a focal region to further direct the energy to the air-bearing surface 110. Electric fields are excited on the surface of the NFT, and these fields are directed out to the ABS 110 for delivery to the media 204. A magnetic pole (e.g., pole 212 in FIG. 2) is positioned proximate the NFT (e.g., above or below the NFT in the z-direction) and applies magnetic fields to the heated media (e.g., media 204 in FIG. 2) during recording.

The waveguide core 206 surrounded by cladding layers 208, 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface. This may result in a highly localized hot spot (not shown) on the media surface when the media 204 is in close proximity to surface of the apparatus.

In order to alleviate negative effects of high temperatures, an NFT can be thermally coupled to the magnetic pole via a heat sink. Even with the heat sink, however, temperatures induced during recording may be high enough to cause material diffusion between the NFT, pole, and heat sink. This reduces NFT efficiency and also reduces the magnetic moment of the recording pole.

In some cases, the NFT 112 is a part of the waveguide core 106. In this embodiment, the waveguide may function as a waveguide and an NFT. This type of waveguide may be referred to herein as a "plasmonic gap waveguide," a "gap waveguide," and/or an "aperture waveguide." The gap waveguide may be embedded in a cladding material that allows the waveguide to operate as a heat sink and an NFT. This allows the gap waveguide to sink heat away from the waveguide core. For example, the gap waveguide may be embedded in a material having a high thermal conductivity such as Au and/or Cu. In some cases, the gap waveguide is embedded in Au because it has one of the highest levels of thermal conductivity and plasmonic quality factor. This configuration may allow for higher localized electric fields that would be translated into smaller thermal spots with higher thermal gradients than in a system having a peg-based NFT. The gap waveguide system may also allow the device to effectively operate at lower temperatures than a system that has a peg-based NFT.

The plasmonic gap waveguide is based on the optical coupling between two surface plasmon polaritons (SPPs) that propagates in each of the interfaces between the waveguide core and the cladding layers. The plasmonic gap waveguide may be excited by injecting an electric TM and/or TE mode into the waveguide. The reduction of the width and gap separation between the layers can be adjusted to shape the thermal spot size and the thermal gradient in the magnetic recording media.

According to various embodiments, a plasmonic gap waveguide comprises a dielectric core placed between two separated metallic stripes forming a metallic-dielectric-metallic sandwich where the two SPPs propagating in the dielectric-metal interfaces are coupled confining the electric field around the gap. In some cases, the plasmonic gap waveguide has a taper that narrows as it approaches the media-facing surface of the slider. The tapered waveguide core may be embedded in a metallic material such as Au. The mode is excited by injecting a TM mode in a wider waveguide that is progressively tapered in order to couple the two SPPs modes into the gap waveguide. The electric field generated at a plasmonic-gap waveguide output is used as a heat source to generate a sharp and highly localized thermal spot on the magnetic media.

Figure 2B:
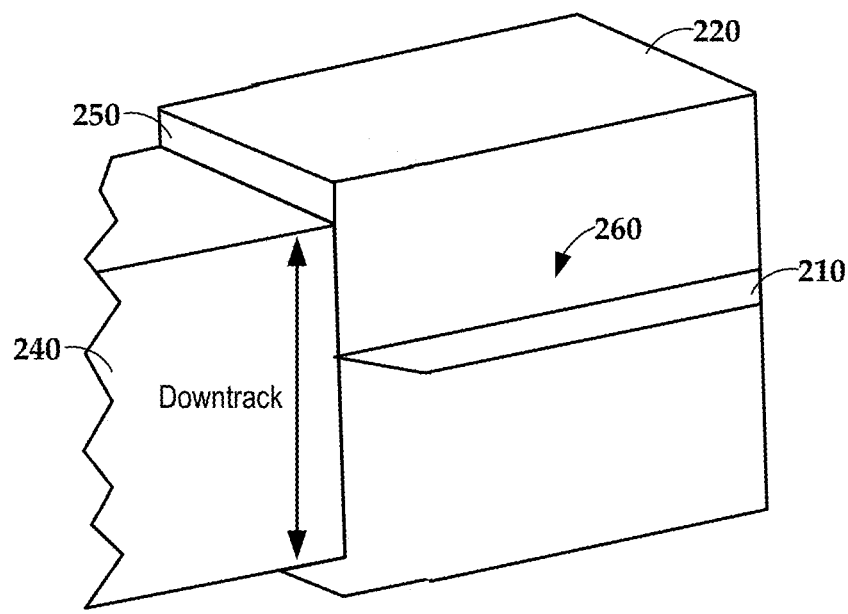
FIG. 2B illustrates a plasmonic gap waveguide that has a narrowing taper as it approaches the air bearing surface in accordance with embodiments described herein.

FIG. 2B illustrates a plasmonic gap waveguide that has a narrowing taper as it approaches the ABS. The waveguide core 210 may have a substantially constant cross sectional width in a first section closer to the light source. According to various embodiments, the waveguide core 210 is a dielectric such as $Ta_2O_5$, for example. The waveguide core 210 may begin to taper in a second section and continue to taper until it reaches the ABS 250 proximate the media 240. In some cases, the waveguide core 210 may stop tapering at a point before the ABS 250. The waveguide core 210 is surrounded by one or more cladding layers 220 that may have a different index of refraction than the material of the waveguide core 210. For example, the index of refraction of the waveguide core 210 may be less than the index of refraction of at least one of the one or more cladding layers 220.

According to various configurations, the plasmonic gap waveguide comprises a trench. In some cases, the trench extends along at least a portion of the waveguide core. The trench may be disposed near or at the media-facing surface of the slider. According to various implementations, the trench is disposed along a surface of the plasmonic gap waveguide that faces the write pole. The trenched plasmonic gap waveguide may have a higher downtrack gradient and/or may have an increased efficiency when compared to a system utilizing a plasmonic gap waveguide without a trench. According to various embodiments, the trench serves to tailor the properties of the hot spot generated in the aperture, but does not act as the resonating NFT itself.

Figure 3A:
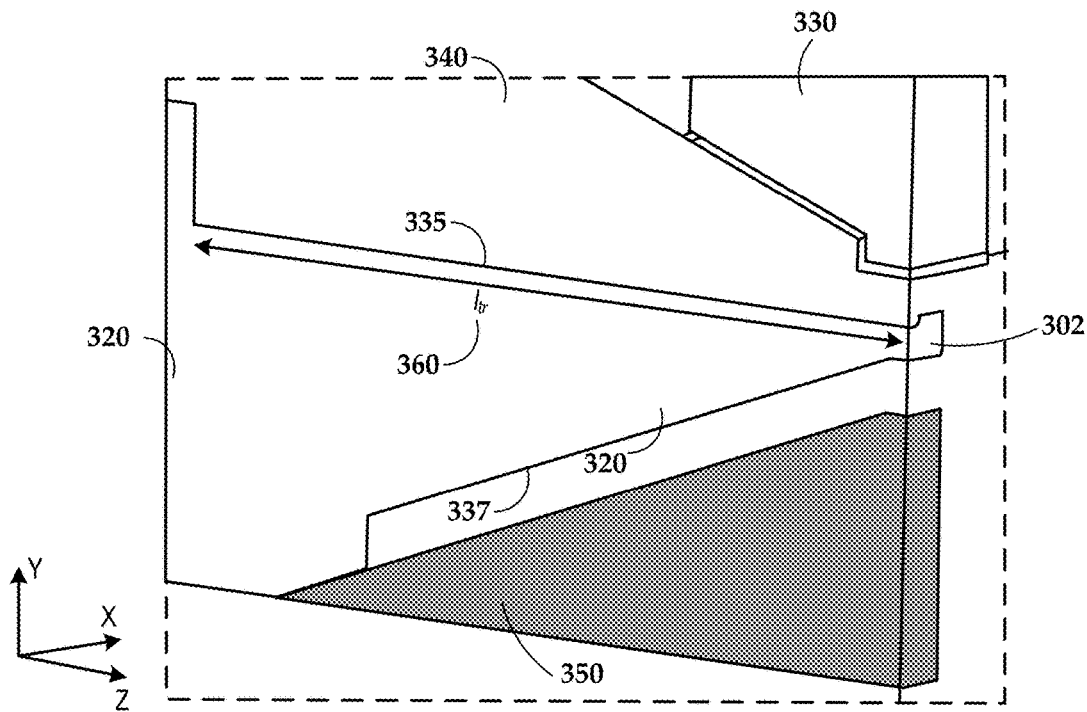
FIG. 3A illustrates a system having a plasmonic gap waveguide including a trench in accordance with embodiments described herein.

FIG. 3A illustrates a system having a plasmonic gap waveguide including a trench in accordance with embodiments described herein. In this example, the trench is located along a portion of a first side 335 of the plasmonic gap waveguide 320 that faces the write pole 330. A length of the trench is represented by 4,360. The trench length 360 may be in a range of about 700 nm to about 900 nm, such as in a range of about 775 nm to about 825 nm. In some cases, the trench length 360 is about 806.9 nm. The waveguide 320 is surrounded by a metallic material 340, e.g., gold. The plasmonic gap waveguide 320 has a second opposing side 337 that faces vertical taper portion 350. The vertical taper portion 350 accommodates SPP propagation along the bottom of the gap waveguide 320. According to various embodiments, the metallic material 340 in between the vertical taper portion 350 and the waveguide 320 is configured to alleviate absorption losses.

Figure 3B:
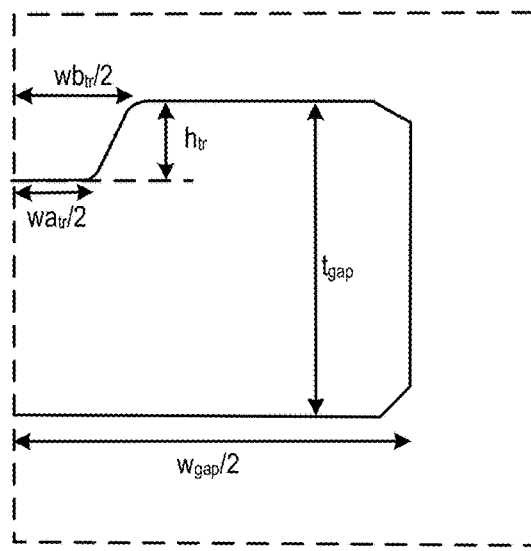
FIGS. 3B-3D illustrate more detailed views of the plasmonic gap waveguide of FIG. 3A in accordance with embodiments described herein.
Figure 3C:
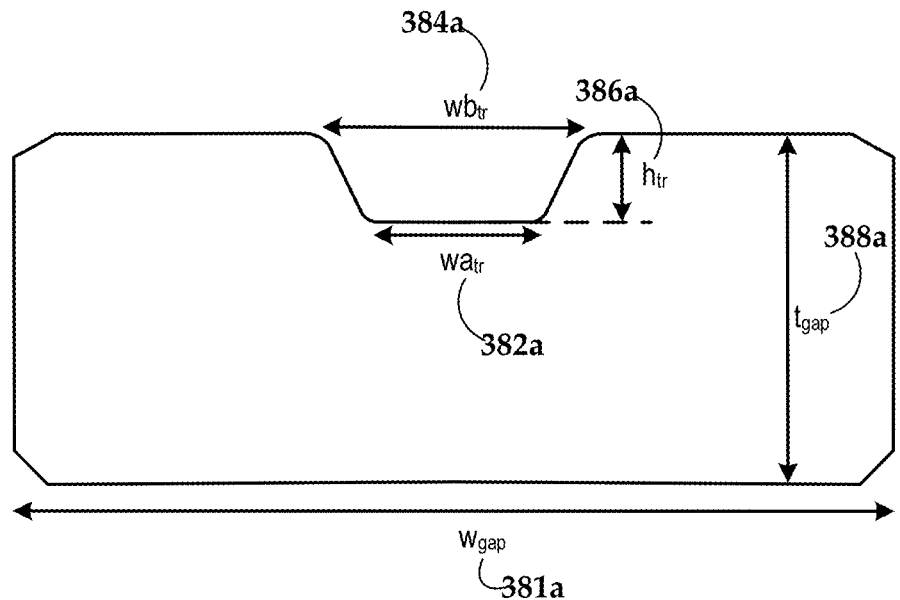
Figure 3D:
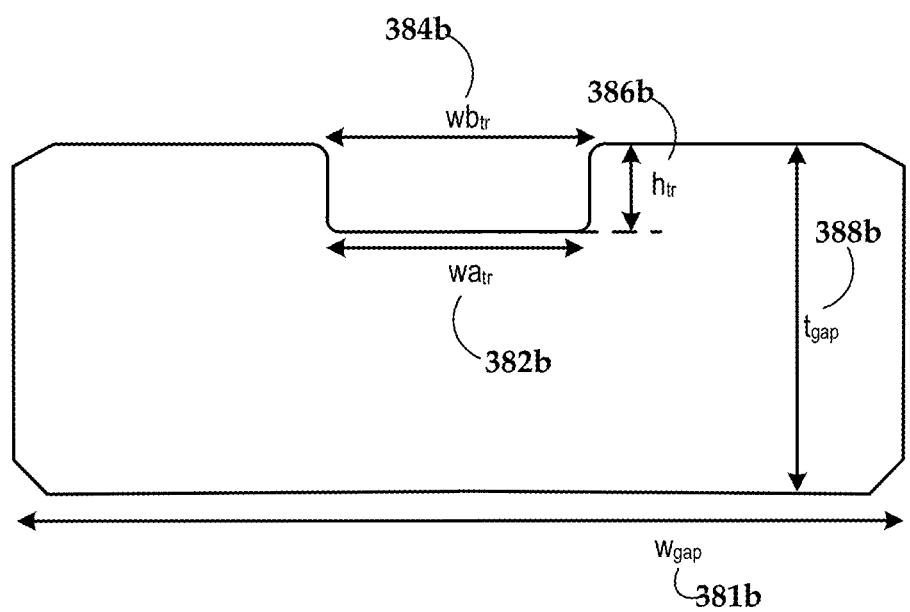

FIGS. 3B-3D illustrate more detailed views of the plasmonic gap of FIG. 3A waveguide 320 from the media facing surface 302. FIG. 3B illustrates a view of the half waveguide 320 from the media facing surface as shown in FIG. 3A. FIG. 3C illustrates the same waveguide as in FIG. 3B, but includes both halves of the waveguide 320. Various dimensions are shown for the plasmonic gap waveguide. The dimensions of the trench may have an impact on the thermal gradient and the increase in efficiency from a configuration having a plasmonic gap waveguide without a trench.

The waveguide includes a bottom trench width, $wa_{tr}$, 382a and a top trench width, $wb_{tr}$, 384a. FIGS. 3B and 3C illustrate an embodiment in which the top width 384a and the bottom width 382a appear to be different values. In these examples, the bottom width 382a is less than the top width 384a. In some cases $wa_{tr}$ 382a is in a range of about 18 nm to about 26 nm, such as in a range of about 20 nm to about 24 nm. According to various implementations, $wb_{tr}$ 384a is in a range of about 20 nm to about 28 nm, such as in a range of about 22 to about 26 nm. In some cases, $wa_{tr}$ 382a is about 22 nm and $wb_{tr}$ 384a is about 24 nm.

In some configurations, the top width 384b is substantially the same as the bottom width 382b as shown in FIG. 3D. For example, the value of $wa_{tr}$ 382b and $wb_{tr}$ 384b may be in a range of about 12 nm to about 16 nm. In some cases, the value of both $wa_{tr}$ 382b and $wb_{tr}$ 384b is about 14 nm. The trench has a height, $h_{tr}$, 386a, 386b. The trench height 386a, 386b may be in a range of about 8 nm to about 13 nm, such as in a range of about 10 nm to about 11 nm. A thickness of the gap waveguide is represented by $t_{gap}$ 388a, 388b and is in a range of about 35 nm to about 45 nm, such as about 40 nm. A width of the gap waveguide is represented by $w_{gap}$ 381a, 381b. $w_{gap}$ 381a, 381b may be in a range of about 80 nm to about 120 nm. In some cases, $w_{gap}$ is about 100 nm.

Figure 4A:
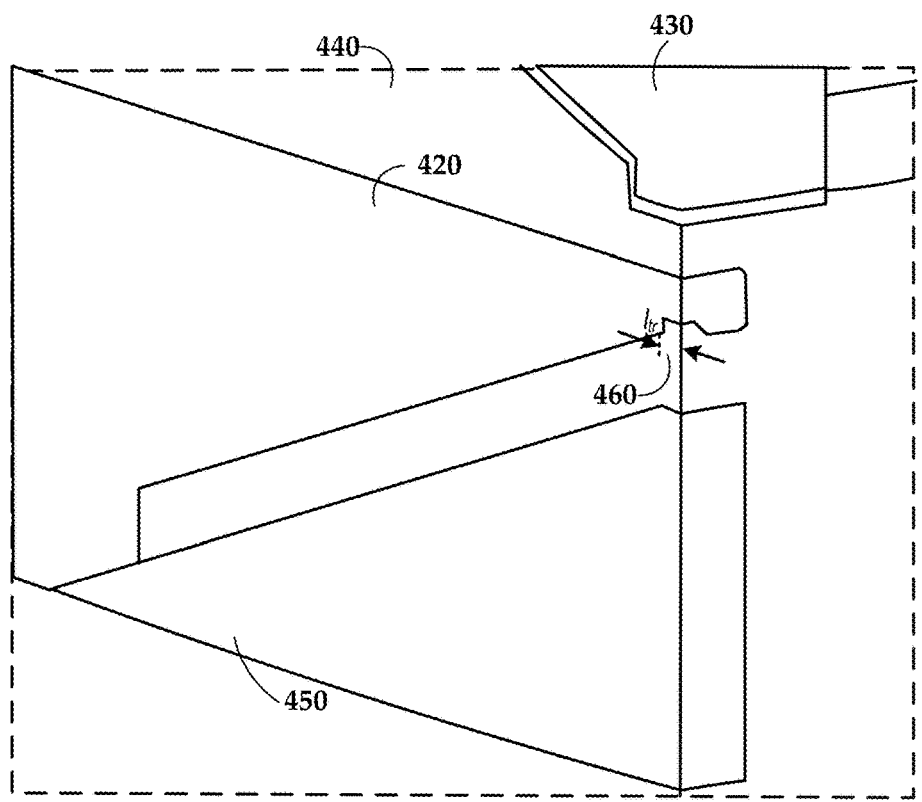
FIG. 4A illustrates a another system having a plasmonic gap waveguide including a trench in accordance with embodiments described herein.
Figure 4B:
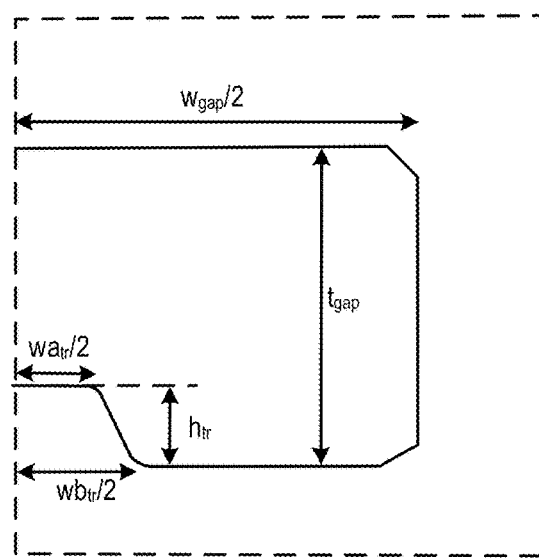
FIGS. 4B-4D illustrate more detailed views of the plasmonic gap waveguide of FIG. 4A in accordance with embodiments described herein.
Figure 4C:
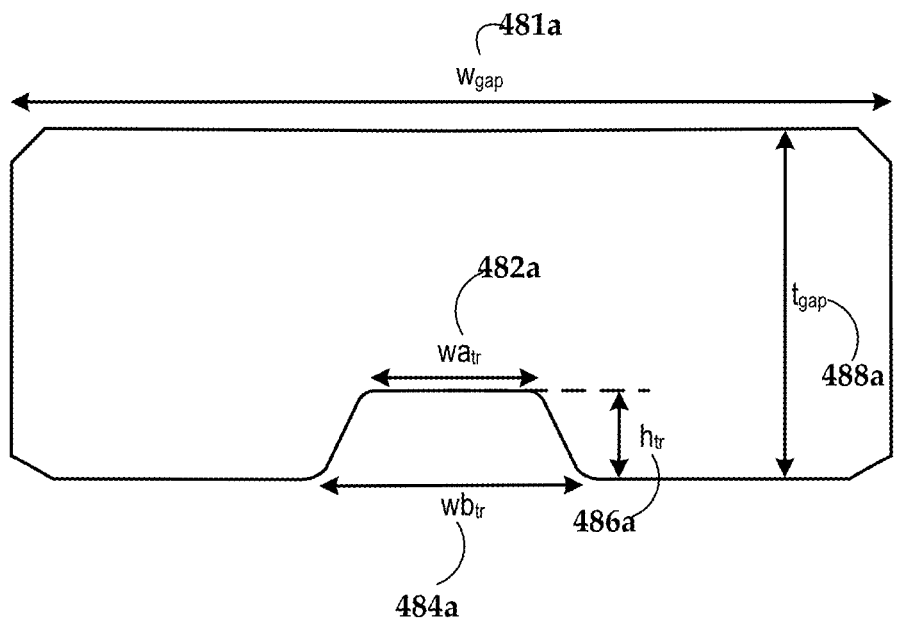
Figure 4D:
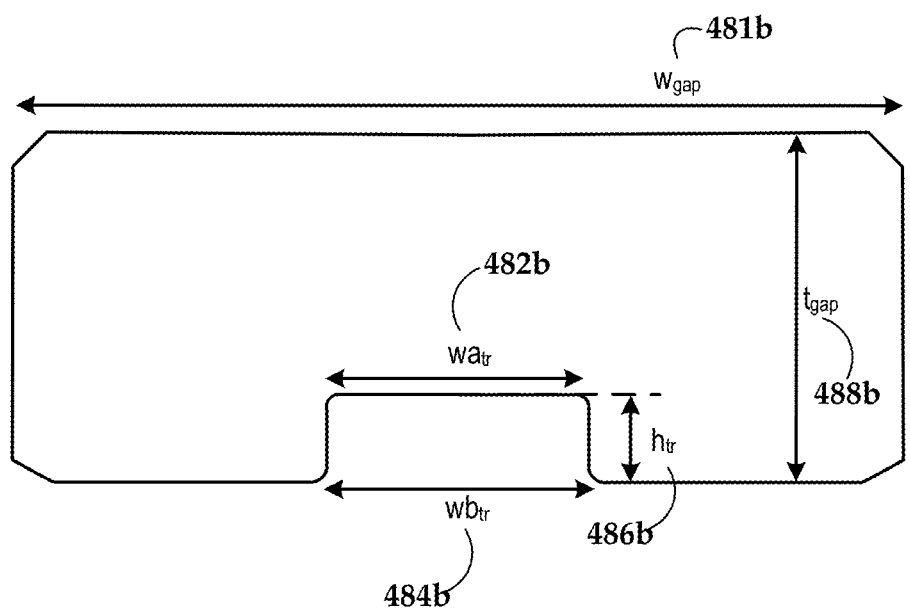

According to various embodiments, the trench is located on a second side of the waveguide 420 that faces the Rh section 450 as illustrated in FIGS. 4A-4D. The trench length, $l_{tr}$, 460 may be in a range of about 15 nm to about 25 nm. In some cases, $l_{tr}$ is about 20 nm. FIGS. 4B, 4C, and 4D illustrate more detailed views of the plasmonic gap of FIG. 4A waveguide 420 from the media facing surface 402. FIG. 4B illustrates a view of the half waveguide 420 from the as shown in FIG. 4A. FIG. 4C illustrates the same waveguide 420 as in FIG. 4B, but it includes both halves of the waveguide 420. Various dimensions are shown for the plasmonic gap waveguide. The waveguide 420 includes a bottom trench width, $wa_{tr}$, 482a and a top trench width, $wb_{tr}$, 484a.

FIGS. 4B and 4C illustrate an embodiment in which the top width, $wb_{tr}$, 484a and the bottom width, $wa_{tr}$, 482a appear to be different values. In these examples, the bottom width, $wa_{tr}$, 482a is less than the top width, $wb_{tr}$, 484a. In some cases, the bottom width, $wa_{tr}$, 482a is in a range of about 16 nm to about 24 nm, such as in a range of about 18 nm to about 22 nm. According to various implementations, the top width, $wb_{tr}$, 484a is in a range of about 35 nm to about 45 nm, such as in a range of about 38 to about 42 nm. In some cases, the bottom width, $wa_{tr}$, 482a is about 20 nm and the top width, $wb_{tr}$, 484a is about 40 nm.

In some configurations, the top width, $wb_{tr}$, 484b is substantially the same as the bottom width, $wa_{tr}$, 482b as shown in FIG. 4D. For example, the value of bottom and top widths, $wa_{tr}$ 482b and $wb_{tr}$ 484b, are in a range of about 12 nm to about 16 nm. In some cases, the value of both bottom and top widths, $wa_{tr}$ 482b and $wb_{tr}$ 484b, is about 14 nm. The trench has a height, $h_{tr}$, 486a, 486b. In some cases, the trench height 486a, 486b is in a range of about 8 nm to about 13 nm, such as in a range of about 10 nm to about 11 nm. In some cases, the trench height, $h_{tr}$, is about 10 nm. A thickness of the gap waveguide is represented by $t_{gap}$ 488a, 488b and is in a range of about 35 nm to about 45 nm, such as about 40 nm. A width of the gap waveguide is represented by $w_{gap}$ 481a, 481b. The gap width, $w_{gap}$, 481a, 481b may be in a range of about 80 nm to about 120 nm. In some cases, the gap width, $w_{gap}$, 481a, 481b is about 100 nm.

The material in the trench in the previous examples may be the same material as the surrounding metallic layers. For example, the trench material may comprise gold, rhodium, iridium, copper alloys (eg. CuZn, CuGe), gold alloys (e.g. AuCuPd), conducting nitrides (e.g. TiN, TaN). In some cases, the trench comprises a material different than the surrounding cladding material. For example, the trench may comprise gold, rhodium, iridium, copper alloys (eg. CuZn, CuGe), gold alloys (e.g. AuCuPd), conducting nitrides (e.g. TiN, TaN)

Figure 5A:
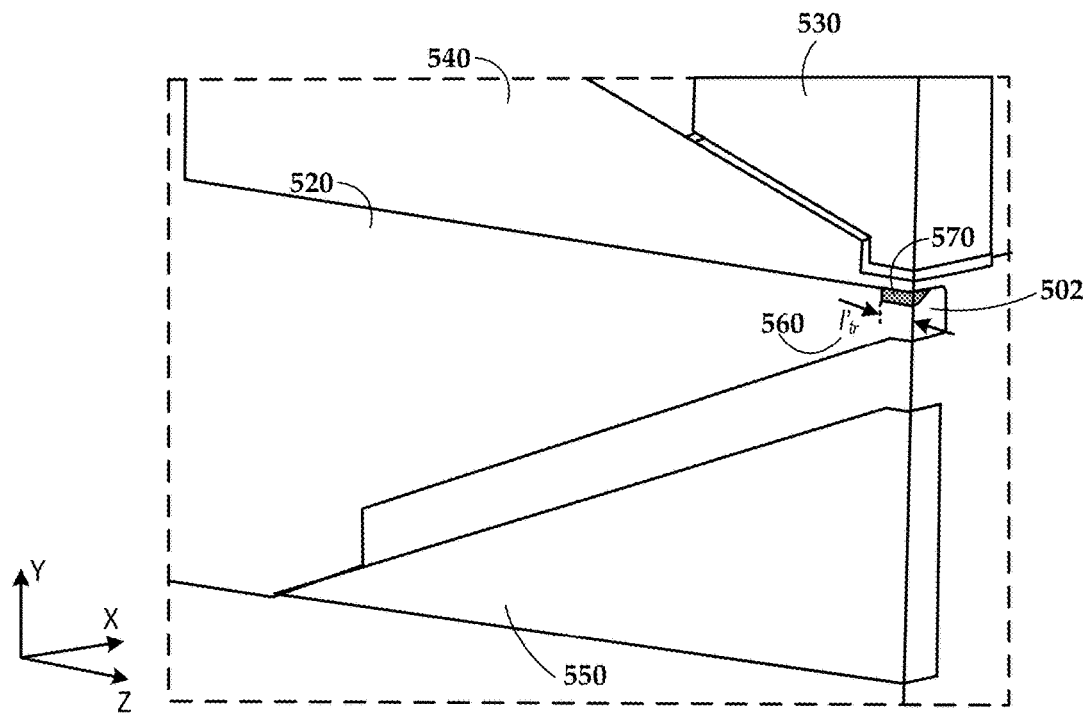
FIGS. 5A and 5B illustrate a system having a plasmonic gap waveguide comprising a trench material different than the surrounding cladding material in accordance with embodiments described herein.

FIGS. 5A-6B illustrate embodiments in which the trench comprises a material different than the surrounding metallic layers. FIGS. 5A and 5B illustrate an example in which the trench faces the write core. The trench length, $l'_{tr}$, 560 may be in a range of about 28 nm to about 36 nm. In some cases, $l'_{tr}$ is about 32 nm. FIG. 5B illustrates a more detailed view of the plasmonic gap waveguide 520 of FIG. 5A from the media facing surface 502. The waveguide 520 includes a bottom trench width, $wa_{tr}$, 582a and a top trench width, $wb_{tr}$, 584a. In some cases, the bottom trench width, $wa_{tr}$, 582a is in a range of about 20 nm to about 28 nm, such as in a range of about 22 nm to about 26 nm. According to various implementations, the top trench width, $wb_{tr}$, 584a is in a range of about 50 nm to about 62 nm, such as a range of about 52 to about 60 nm. In some cases, the bottom trench width, $wa_{tr}$, 582a is about 24 nm and the toptrench width, $wb_{tr}$, 584a is about 56 nm. In some cases, the bottom trench width, $wa_{tr}$, 582a is substantially the same as the top trench width, $wb_{tr}$, 584a.

The trench has a height, $h_{tr}$, 586. In some cases, the trench height, $h_{tr}$, 586 is in a range of about 8 nm to about 13 nm, such as in a range of about 10 nm to about 11 nm. In some cases, the trench height, $h_{tr}$, 586 is about 10 nm. A thickness of the gap waveguide is represented by $t_{gap}$ 588 and is in a range of about 35 nm to about 45 nm, such about 40 nm. A width of the gap waveguide is represented by $w_{gap}$ 581. $w_{gap}$ 581 may be in a range of about 80 nm to about 120 nm. In some cases, the gap width, $w_{gap}$, is about 100 nm.

Figure 6A:
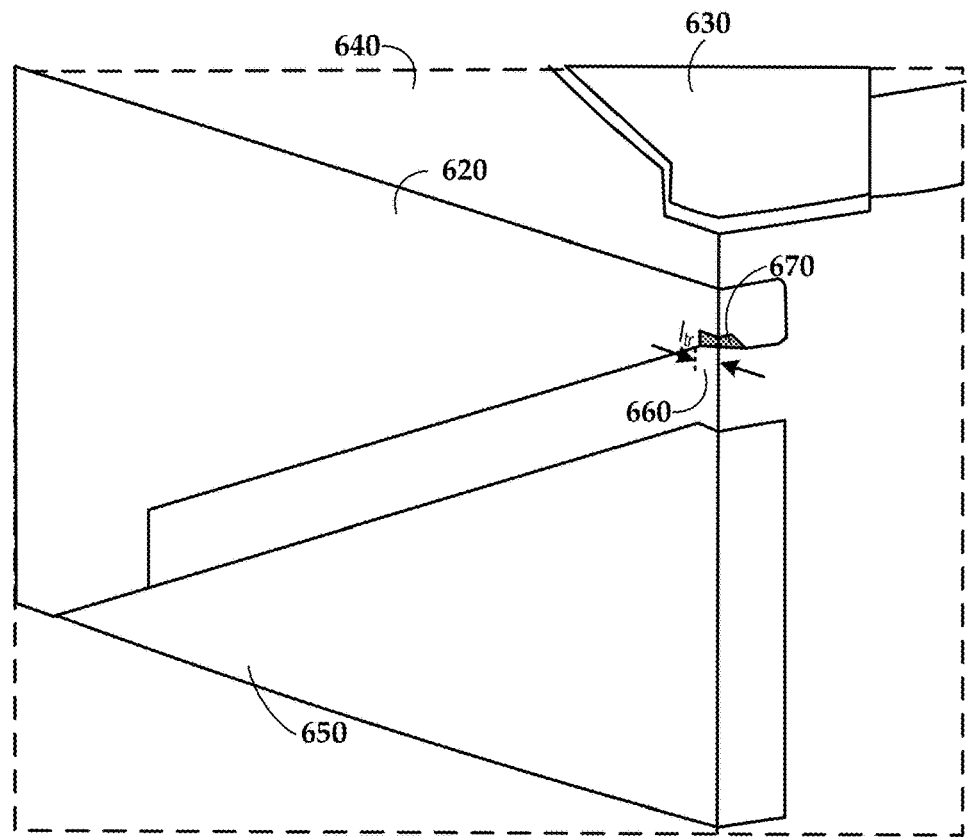
FIGS. 6A and 6B illustrate another system having a plasmonic gap waveguide comprising a trench material different than the surrounding cladding material in accordance with embodiments described herein.
Figure 6B:
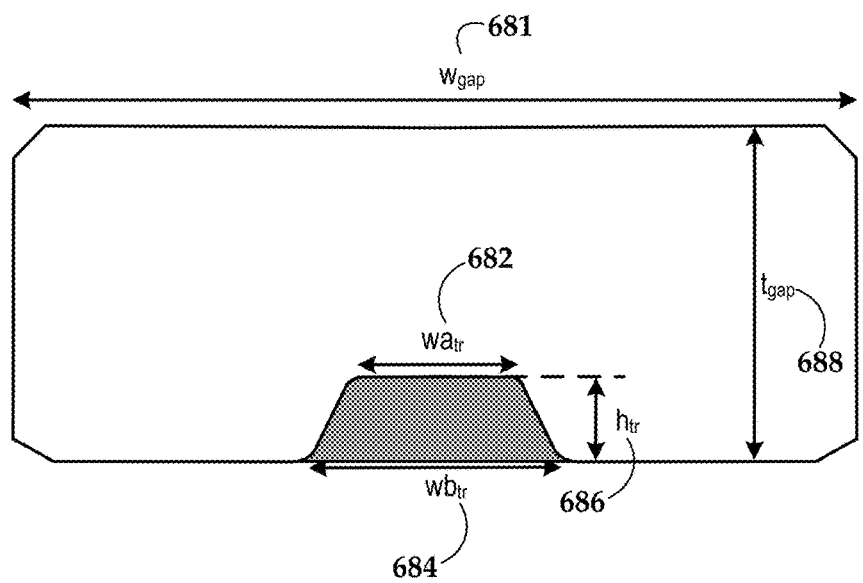

FIGS. 6A and 6B illustrate example embodiments in which the trench comprises material different than the surrounding cladding material and faces the Rh portion. FIG. 6B illustrates a more detailed view of the plasmonic gap waveguide 620 of FIG. 6A from the media facing surface 602. Various dimensions are shown for the plasmonic gap waveguide 620. The waveguide 620 includes a bottom trench width, $wa_{tr}$, 682a and a top trench width, $wb_{tr}$, 684a. In some cases, the bottom trench width, $wa_{tr}$, 682a is in a range of about 18 nm to about 26 nm, such as in a range of about 20 nm to about 24 nm. According to various implementations, the top trench width, $wb_{tr}$, 684a is in a range of about 46 nm to about 58 nm, such about 48 to about 56 nm. According to various embodiments, the bottom trench width, $wa_{tr}$, 682a is about 22 nm and the top trench width, $wb_{tr}$, 684a is about 52 nm. In some cases, the bottom trench width, $wa_{tr}$, 682a is substantially the same as the top trench width, $wb_{tr}$, 684a.

The trench has a height, $h_{tr}$, 686. In some cases, the trench height, $h_{tr}$, 686 is in a range of about 8 nm to about 13 nm, such as in a range of about 10 nm to about 11 nm. In some cases, the trench height, $h_{tr}$, 686 is about 10 nm. A thickness of the gap waveguide is represented by $t_{gap}$ 688 and is in a range of about 35 nm to about 45 nm, such as about 40 nm. A width of the gap waveguide is represented by $w_{gap}$ 681. The gap width, $w_{gap}$, 481 may be in a range of about 80 nm to about 120 nm. In some cases, the gap width, $w_{gap}$, 481 is about 100 nm.

According to various embodiments, the trench may serve to improve and/or reduce a thermal curvature, δ, of the hot spot by effectively narrowing the thickness, $t_{gap}$. The presence of the trench may result in a higher downtrack gradient compared to an embodiment without a trench. Table 1 shows example dimensions, thermal gradient, and thermal curvature for different waveguide configurations.

TABLE 1

Figure 5B:
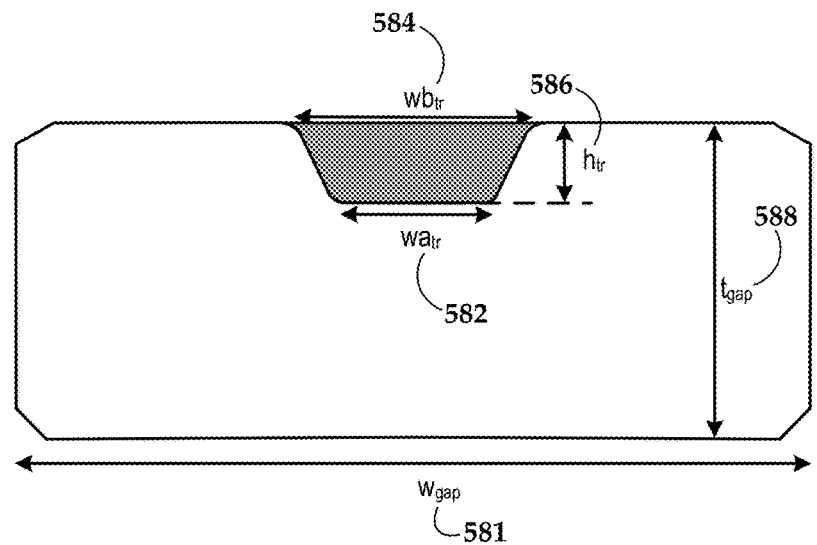

| Trench configuration | $t_{gap}$ | $w_{gap}$ | $l_{tr}$ | $h_{tr}$ | $wa_{tr}$ | $wb_{tr}$ | TGD (K/nm) | δ (nm) |
|---|---|---|---|---|---|---|---|---|
| No Trench, | 40 | 100 | N/A | N/A | N/A | N/A | 8.94 | 3.37 |
| FIGS. 3A-3D | 40 | 100 | 806.9 | 11 | 14 | 14 | 15.37 | 1.81 |
| FIGS. 3A-3D | 40 | 100 | 806.9 | 10 | 22 | 24 | 12.51 | 1.99 |
| FIGS. 4A-4D | 40 | 100 | 20 | 10 | 20 | 40 | 10.23 | 3.00 |
| FIGS. 5A-5B ($l'_{tr}$ = 32 nm) | 40 | 100 | 806.9 | 10 | 24 | 56 | 9.98 | 2.40 |
| FIGS. 6A-6B | 40 | 100 | 806.9 | 10 | 22 | 52 | 10.03 | 2.68 |

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

The invention claimed is:

1. An apparatus comprising:
   a slider configured for heat-assisted magnetic recording, the slider comprising:
   an input coupler configured to receive light excited by a light source; and
   an aperture waveguide comprising:
   a waveguide core tapering along a light propagation direction from a first cross-sectional width to a second cross-sectional width, the second cross sectional width being smaller than the first cross sectional width, the waveguide core comprising a trench at an output end, the trench configured to tailor properties of a hot spot generated in an aperture of the aperture waveguide; and
   at least one cladding layer surrounding the waveguide core, wherein the waveguide is configured to provide a surface plasmon-enhanced near-field radiation pattern proximate the output end in response to the received light.

2. The apparatus of claim 1, wherein a material is disposed within the material is different from a waveguide core material.

3. The apparatus of claim 1, wherein a material is disposed within the trench and the material comprises at least one of Au, Rh, Ir, CuZn, CuGe, AuCuPd, TiN, and TaN.

4. The apparatus of claim 1, wherein the waveguide core comprises a first side facing a write pole of the slider and a second opposing side facing away from the write pole.

5. The apparatus of claim 4, wherein the trench is disposed on the first side of the waveguide core.

6. The apparatus of claim 4, wherein the trench is disposed on the second side of the waveguide core.

7. The apparatus of claim 1, wherein a material is disposed within the trench and the material comprises a same material as a surrounding metallic material.

8. The apparatus of claim 1, wherein a material is disposed within the trench and the material comprises a different material than a surrounding metallic material.

9. An apparatus comprising:
a slider configured for heat-assisted magnetic recording, the slider comprising:
an input coupler configured to receive light excited by a light source; and
an aperture waveguide comprising:
a waveguide core tapering along a light propagation direction from a first cross-sectional width to a second cross-sectional width, the second cross sectional width being smaller than the first cross sectional width, the waveguide core comprising a trench extending along at least a portion of the waveguide core, the trench configured to tailor properties of a hot spot generated in an aperture of the aperture waveguide; and
at least one cladding layer surrounding the waveguide core, wherein the waveguide is configured to provide a surface plasmon-enhanced near-field radiation pattern proximate the output end in response to the received light.

10. The apparatus of claim 9, wherein a material is disposed within the trench and the material is different from a waveguide core material.

11. The apparatus of claim 9, wherein a material is disposed within the trench and the material comprises at least one of Au, Rh, Ir, CuZn, CuGe, AuCuPd, TiN, and TaN.

12. The apparatus of claim 9, wherein the waveguide core comprises a first side facing a write pole of the slider and a second opposing side facing away from the write pole.

13. The apparatus of claim 12, wherein the trench is disposed on the first side of the waveguide core.

14. The apparatus of claim 12, wherein the trench is disposed on the second side of the waveguide core.

15. The apparatus of claim 9, wherein a material is disposed within the trench and the material comprises a same material as a surrounding metallic material.

16. The apparatus of claim 9, wherein a material is disposed within the trench and the material comprises a different material than a surrounding metallic material.

17. A method comprising:
providing a surface plasmon-enhanced near-field radiation pattern to an output end of an aperture waveguide in response to receiving light output by a light source, the waveguide comprising:
a waveguide core tapering along a light propagation direction from a first cross-sectional width to a second cross-sectional width, the second cross sectional width being smaller than the first cross sectional width, the waveguide core comprising a trench at the output end, the trench configured to tailor properties of a hot spot generated in an aperture of the aperture waveguide; and
at least one cladding layer surrounding the waveguide core.

18. The method of claim 17, wherein the waveguide core comprises a first side facing a write pole and a second opposing side facing away from the write pole.

19. The method of claim 18, wherein the trench is disposed on the first side of the waveguide core.

20. The method of claim 18, wherein the trench is disposed on the second side of the waveguide core.

* * * * *